(12) United States Patent
Sallam

(10) Patent No.: US 7,337,327 B1
(45) Date of Patent: Feb. 26, 2008

(54) USING MOBILITY TOKENS TO OBSERVE MALICIOUS MOBILE CODE

(75) Inventor: Ahmed Sallam, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 696 days.

(21) Appl. No.: 10/814,843

(22) Filed: Mar. 30, 2004

(51) Int. Cl.
G06F 9/00 (2006.01)
(52) U.S. Cl. ............... 713/189; 713/193; 713/194
(58) Field of Classification Search ............ 713/189, 713/193, 194
See application file for complete search history.

(56) References Cited

U.S. PATENT DOCUMENTS

| | | | |
|---|---|---|---|
| 4,776,537 A | 10/1988 | Kennicott |
| 4,888,798 A | 12/1989 | Earnest |
| 5,050,212 A | 9/1991 | Dyson |
| 5,103,476 A | 4/1992 | Waite et al. |
| 5,182,770 A | 1/1993 | Medveczky et al. |
| 5,432,851 A | 7/1995 | Scheidt et al. |
| 5,440,723 A | 8/1995 | Arnold et al. |
| 5,450,576 A | 9/1995 | Kennedy |
| 5,452,442 A | 9/1995 | Kephart |
| 5,473,769 A | 12/1995 | Cozza |
| 5,530,757 A | 6/1996 | Krawczyk |
| 5,548,532 A | 8/1996 | Menand et al. |
| 5,564,054 A | 10/1996 | Bramnick et al. |
| 5,572,590 A | 11/1996 | Chess |
| 5,596,711 A | 1/1997 | Burckhartt et al. |
| 5,606,609 A | 2/1997 | Houser et al. |
| 5,625,693 A | 4/1997 | Rohatgi et al. |
| 5,661,848 A | 8/1997 | Bonke et al. |
| 5,696,822 A | 12/1997 | Nachenberg |
| 5,708,776 A | 1/1998 | Kikinis |
| 5,715,174 A | 2/1998 | Cotichini et al. |
| 5,715,464 A | 2/1998 | Crump et al. |

(Continued)

FOREIGN PATENT DOCUMENTS

DE    100 21 686 A1    11/2001

(Continued)

OTHER PUBLICATIONS

Richter, J., Microsoft.com web pages (online). "Design a Windows NT Service to Exploit Special Operating System Facilities", Oct. 1997 (retrieved Aug. 29, 2003). Retrieved from the Internet: <URL: http://www.microsoft.com/msj/1097/winnt.aspx.

(Continued)

*Primary Examiner*—Thomas R. Peeso
(74) *Attorney, Agent, or Firm*—Fenwick & West LLP

(57) ABSTRACT

One or more mobility token managers (101) track movement of files (105) within a network. A mobility token manager (101) on a source computer (113) detects an attempt to write a file (105) to a target computer (117). Responsive to the detection, the mobility token manager (101) writes a mobility token (103) containing data concerning at least the file (105) and the write operation to the target computer (117). A mobility token manager (101) on the target computer (117) detects that the mobility token (103) is being written to the target computer (117). The mobility token manager (101) on the target computer (117) reads the mobility token (103), and determines relevant information concerning the file (105) associated with the mobility token (103).

20 Claims, 3 Drawing Sheets

U.S. PATENT DOCUMENTS

| | | |
|---|---|---|
| 5,758,359 A | 5/1998 | Saxon |
| 5,765,151 A | 6/1998 | Senator |
| 5,799,088 A | 8/1998 | Raike |
| 5,802,080 A | 9/1998 | Westby |
| 5,812,763 A | 9/1998 | Teng |
| 5,854,759 A | 12/1998 | Kaliski, Jr. et al. |
| 5,889,943 A | 3/1999 | Ji et al. |
| 5,922,072 A | 7/1999 | Hutchinson et al. |
| 5,951,698 A | 9/1999 | Chen et al. |
| 5,956,475 A | 9/1999 | Burckhartt et al. |
| 5,956,481 A | 9/1999 | Walsh et al. |
| 5,960,170 A | 9/1999 | Chen et al. |
| 5,974,546 A | 10/1999 | Anderson |
| 5,978,917 A | 11/1999 | Chi |
| 5,987,610 A | 11/1999 | Franczek et al. |
| 6,000,032 A | 12/1999 | Millard |
| 6,014,744 A | 1/2000 | McKaughan et al. |
| 6,014,767 A | 1/2000 | Glaise |
| 6,048,090 A | 4/2000 | Zook |
| 6,052,709 A | 4/2000 | Paul et al. |
| 6,061,788 A | 5/2000 | Reynaud et al. |
| 6,070,244 A | 5/2000 | Orchier et al. |
| 6,072,830 A | 6/2000 | Proctor et al. |
| 6,079,016 A | 6/2000 | Park |
| 6,088,803 A | 7/2000 | Tso et al. |
| 6,094,731 A | 7/2000 | Waldin et al. |
| 6,104,872 A | 8/2000 | Kubota et al. |
| 6,108,799 A | 8/2000 | Boulay et al. |
| 6,167,434 A | 12/2000 | Pang |
| 6,192,379 B1 | 2/2001 | Bekenn |
| 6,199,181 B1 | 3/2001 | Rechef et al. |
| 6,275,938 B1 | 8/2001 | Bond et al. |
| 6,338,141 B1 | 1/2002 | Wells |
| 6,357,008 B1 | 3/2002 | Nachenberg |
| 6,370,648 B1 | 4/2002 | Diep |
| 6,493,007 B1 | 12/2002 | Pang |
| 6,535,891 B1 | 3/2003 | Fisher et al. |
| 6,552,814 B2 | 4/2003 | Okimoto et al. |
| 6,611,925 B1 | 8/2003 | Spear |
| 6,622,150 B1 | 9/2003 | Kouznetsov et al. |
| 6,678,734 B1 | 1/2004 | Haatainen et al. |
| 6,697,950 B1 | 2/2004 | Ko |
| 6,721,721 B1 | 4/2004 | Bates et al. |
| 6,748,534 B1 | 6/2004 | Gryaznov et al. |
| 6,763,462 B1 | 7/2004 | Marsh |
| 6,813,712 B1 | 11/2004 | Luke |
| 6,851,057 B1 | 2/2005 | Nachenberg |
| 6,910,134 B1 | 6/2005 | Maher et al. |
| 2002/0004908 A1 | 1/2002 | Galea |
| 2002/0035696 A1 | 3/2002 | Thacker |
| 2002/0046275 A1 | 4/2002 | Crosbie et al. |
| 2002/0083175 A1 | 6/2002 | Afek et al. |
| 2002/0091940 A1 | 7/2002 | Wellborn et al. |
| 2002/0157008 A1 | 10/2002 | Radatti |
| 2002/0162015 A1 | 10/2002 | Tang |
| 2002/0178374 A1 | 11/2002 | Swimmer et al. |
| 2003/0023865 A1 | 1/2003 | Cowie et al. |
| 2003/0051026 A1 | 3/2003 | Carter et al. |
| 2003/0065926 A1 | 4/2003 | Schultz et al. |
| 2003/0115485 A1 | 6/2003 | Milliken |
| 2003/0120951 A1 | 6/2003 | Gartside et al. |
| 2003/0126449 A1 | 7/2003 | Kelly et al. |
| 2003/0140049 A1 | 7/2003 | Radatti |
| 2003/0191966 A1 | 10/2003 | Gleichauf |
| 2003/0212902 A1 | 11/2003 | van der Made |
| 2003/0236995 A1 | 12/2003 | Fretwell, Jr. |
| 2004/0015712 A1 | 1/2004 | Szor |
| 2004/0015726 A1 | 1/2004 | Szor |
| 2004/0030913 A1 | 2/2004 | Liang et al. |
| 2004/0158730 A1 | 8/2004 | Sarkar |
| 2004/0162808 A1 | 8/2004 | Margolus et al. |
| 2004/0181687 A1 | 9/2004 | Nachenberg et al. |
| 2005/0021740 A1 | 1/2005 | Bar et al. |
| 2005/0044406 A1 | 2/2005 | Stute |
| 2005/0132205 A1 | 6/2005 | Palliyil et al. |
| 2005/0177736 A1 | 8/2005 | De los Santos et al. |
| 2005/0204150 A1 | 9/2005 | Peikari |
| 2006/0064755 A1 | 3/2006 | Azadet et al. |

FOREIGN PATENT DOCUMENTS

| | | |
|---|---|---|
| EP | 0858031 A1 | 8/1998 |
| EP | 1 280 039 A | 1/2003 |
| GB | 2 364 142 A | 1/2002 |
| WO | WO 93/25024 A1 | 12/1993 |
| WO | WO 95/15522 A1 | 6/1995 |
| WO | WO 95/22794 A1 | 8/1995 |
| WO | WO 97/39399 A | 10/1997 |
| WO | WO 01/91403 A | 11/2001 |
| WO | WO 02/05072 A | 1/2002 |

OTHER PUBLICATIONS

Parkhouse, Jayne, "Pelican SafeTNet 2.0", [online] June 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

News Release—Symantec Delivers Cutting-Edge Anti-Virus Technology with Striker32, Oct. 1, 1999, 2 pages, [online]. Retrieved on Nov. 11, 2003. Retrieved from the Internet:<URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

Delio, M., "Virus Throttle a Hopeful Defense", Wired News, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

MacNamra, John E., "Technical Aspects of Data Communication", 2ed. 1982, Digital Equipment Corporation, U.S.A. pp. 110-122.

Ore, Oystein, "Number Theory and Its History", 1976 Gudron Ore, U.S.A. pp. 124-129.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997.

"PC Medic 97 User's Guide" Manual, McAfee Associates, Inc., 1997, 60 pages.

Symantec Corporation, "Norton Utilities for Windows User's Guide—Version 2.0", 1996.

Symantec Corporation "Norton AntiVirus Corporation Edition 7.0" Manual, 1999, Version 1, 44 pages.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

USING MOBILITY TOKENS TO OBSERVE MALICIOUS MOBILE CODE

TECHNICAL FIELD

This invention pertains generally to computer security, and more specifically to using mobility tokens to observe malicious mobile code.

BACKGROUND ART

Networked computers are vulnerable to malicious computer code attacks, such as worms, viruses and Trojan horses. As used herein, "malicious computer code" is any code that enters a computer without an authorized user's knowledge and/or without an authorized user's consent.

Malicious mobile executable files comprise a major security threat. Mobile executable files are typically not signed, and do not carry a digital signature. Thus, the identity of their author(s) is unknown, and they should be suspected of being potentially malicious. For example, worms are often spread as a form of malicious mobile executable file.

Malicious mobile executable files such as worms often utilize open shares to spread themselves within networks. However, legitimate code can also be copied within a network this way. Being able to track mobile executable files within networks is advantageous in determining whether the code is malicious or not, and blocking and eliminating detected malicious mobile code.

To determine whether a mobile file is malicious, and how to eliminate threats from detected malicious mobile files, it would be helpful to know the answers to questions such as:
What is the identity of the user who first introduced the file into the network?
From which computer did the file originate?
When did the file originate?
On to which other computers has the file been copied?
What route has the file taken, over what time period?
Is there a known malicious code signature associated with the file?
Is that signature available on any of the computers on which the file is installed?

There is no mechanism within Microsoft Windows® or other operating systems to automatically determine or track such information as a mobile file moves around a network. What is needed are methods, systems and computer readable media for tracking mobile files in real-time as they move throughout a network via open shares.

DISCLOSURE OF INVENTION

The present invention comprises methods, systems and computer readable media for tracking movement of files (105) within a network. A mobility token manager (101) on a source computer (113) detects an attempt to write a file (105) to a target computer (117). Responsive to the detection, the mobility token manager (101) writes a mobility token (103) containing data concerning at least the file (105) and the write operation to the target computer (117).

A mobility token manager (101) on the target computer (117) detects that the mobility token (103) is being written to the target computer (117). The mobility token manager (101) on the target computer (117) reads the mobility token (103), and determines relevant information concerning the file (105) associated with the mobility token (103).

In some embodiments, mobility token managers (101) are instantiated within a file system filter driver (107). In other embodiments, mobility token managers (101) are instantiated as at least one system call wrapper (301).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
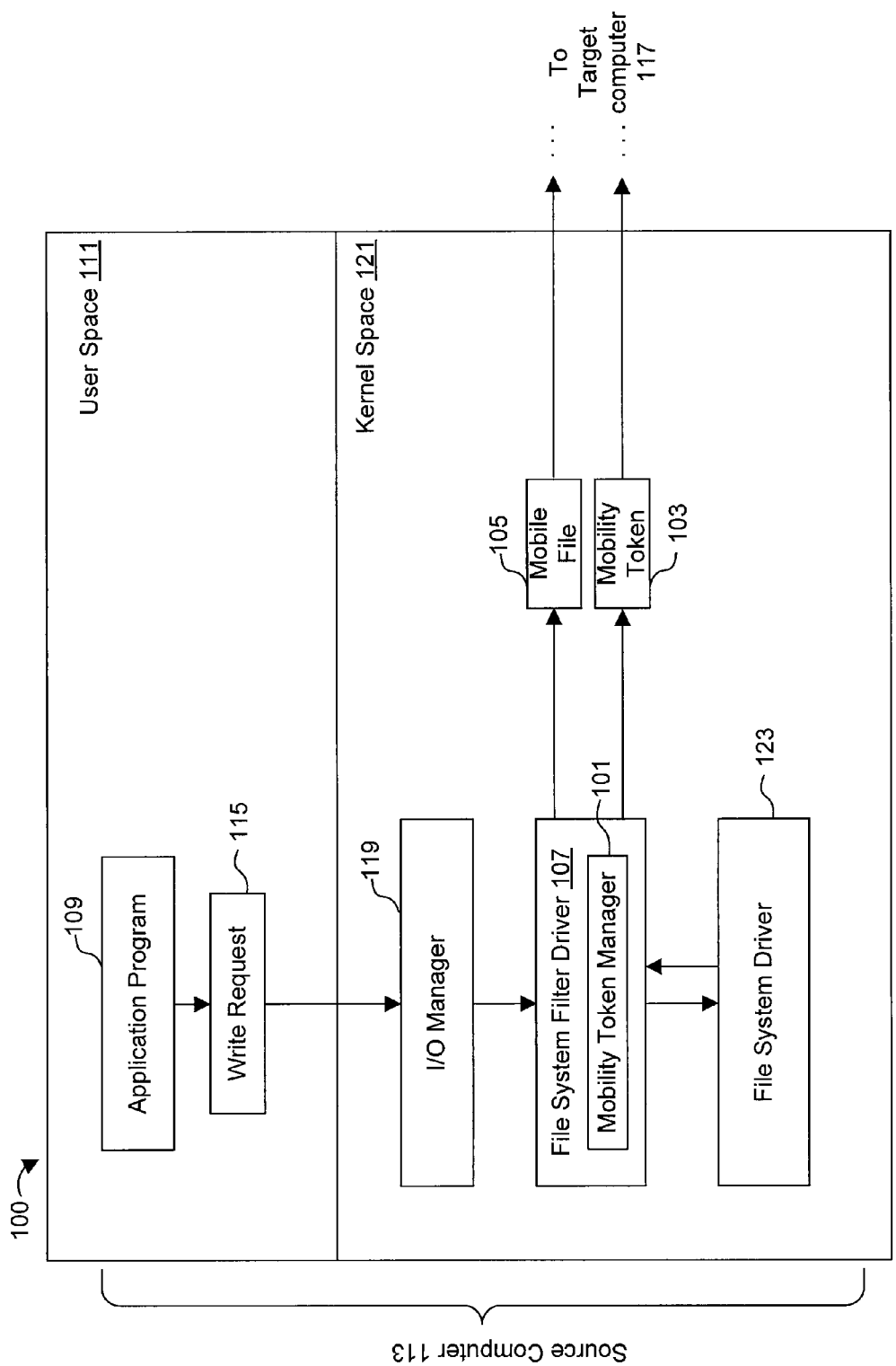
FIG. 1 is a block diagram illustrating a high level overview of a source computer processing mobility tokens, according to some embodiments of the present invention.

FIG. 1 illustrates a high level overview of a system 100 for performing some embodiments of the present invention. A mobility token manager 101 uses mobility tokens 103 to track mobile files 105. It is to be understood that although the mobility token manager 101 is illustrated as a single entity, as the term is used herein a mobility token manager 101 refers to a collection of functionalities which can be implemented as software, hardware, firmware or any combination of the three. Where a mobility token manager 101 is implemented as software, it can be implemented as a standalone program, but can also be implemented in other ways, for example as part of a larger program, as a plurality of separate programs, or as one or more statically or dynamically linked libraries.

In FIG. 1, the mobility token manager 101 is illustrated as being within a file system filter driver 107. The implementation mechanics of file system filter drivers 107 are known to those of ordinary skill in the relevant art. For example, in Microsoft Windows® NT and related versions of Microsoft Windows®, a network file system filter driver 107 can be attached to the Microsoft LANMAN network redirector (mrxsmb.sys). In other embodiments, the mobility token manager 101 is not implemented within a file system filter driver 107, but instead in other ways, for example as a collection of system call wrappers, as discussed in greater detail below.

As illustrated in FIG. 1, the mobility token manager 101 uses mobility tokens 103 (special purpose files described in greater detail below) to track mobile files 105 (e.g., files being moved within a network). Consider the scenario illustrated in FIG. 1, wherein an application program 109 running in user space 111 on a source computer 113 makes a write request 115 to copy a file 105 to a remote target computer 117 (not illustrated in FIG. 1) via an open share. Such a request 115 could have the form, for example, of "copy file_name \\target_computer_name_\\open_share_name\\local_file_name." The request 115 is then processed by the operating system input output (I/O) manager 119 running in kernel space 121, which in turn passes it to the file system driver 123 (the file system driver 123 utilized in the case of copying to a remote computer 117 through an open share under Windows® would be the Windows file system driver network redirector mrxsmb.sys). The I/O manager 119 illustrated in FIG. 1 would be present in various versions of Windows®, but other embodiments of the present invention are implemented under operating systems which may not include the illustrated I/O manager 119. As illustrated, the mobility token manager 101 on the source computer 113 is implemented as a part of a file system filter driver 107, which is attached to the file system driver 123, and filters all of the file system driver's 123 throughput.

Because mobile files 105 being written to a target computer 117 go through the file system driver 123 of the source computer 113, the mobility token manager 101 installed in the filter driver 107 attached thereto can recognize all such mobile files 105, at write time.

When the mobility token manager 101 recognizes a mobile file 105 being written to a target computer 117 through the file system driver 123, the mobility token manager 101 writes another file (a mobility token 103) to the target computer 117 to which the mobile file 105 is written. Since the filter driver 107 of which the mobility token manager 101 is a part is already writing to the target computer 117, then it is guaranteed that it has proper write access to the target folder of this remote location. In various embodiments, the mobility token manager 101 writes mobility tokens 101 concerning some or all mobile files 105 being written to target computers 117 as desired.

The mobility token 103 can contain information concerning the source computer 113 (e.g., IP address, computer name, primary domain controller name, etc.), information concerning the written mobile file 105 (e.g., file name, content-based hash value, digital signature information, version information, last modification date, last modification time, etc.), information concerning the user who has ownership of the application program 115 that requested the write operation (e.g., user account name, user account number, SID, etc.) plus any other additional relevant information as desired (e.g., date and time of the write operation, etc.). Of course, in various embodiments mobility tokens 103 contain more or less information as desired. Because each user typically has a byte quota that it can write to the target machine, mobility tokens 103 are kept small. The specific size limitation is a variable design choice. Mobility tokens 103 can but need not be compressed in order to save space. Additionally, mobility tokens 103 typically will be secured through standard cryptography techniques.

Figure 2:
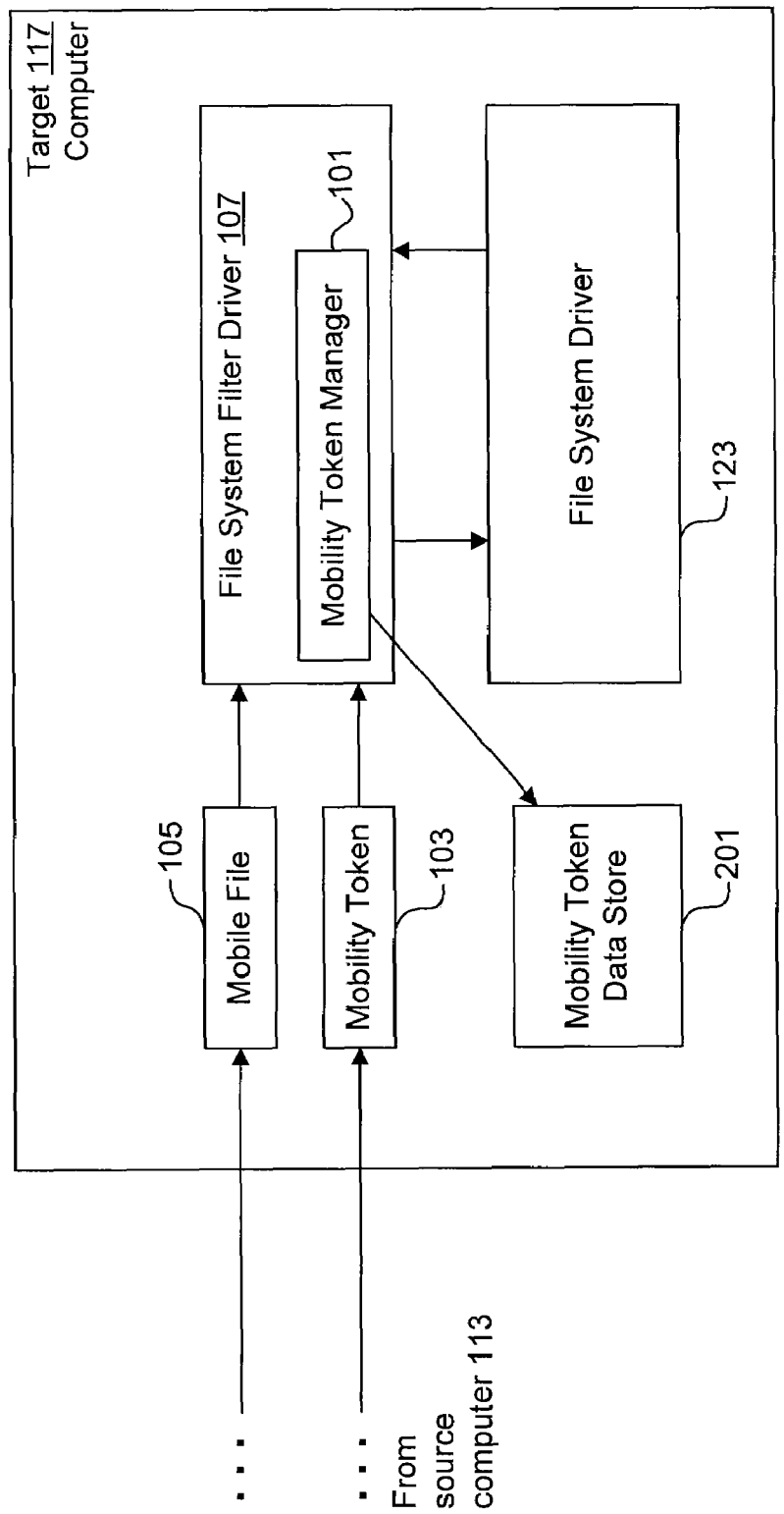
FIG. 2 is a block diagram illustrating a high level overview of a target computer processing mobility tokens, according to some embodiments of the present invention.

As illustrated in FIG. 2, in some embodiments a mobility token manager 101 will also be instantiated on the target computer 117. In some embodiments, the mobility token manager 101 on a source computer 113 only generates a mobility token 103 when there is another mobility token manager 101 running on the target computer 117.

Upon the close or cleanup of any remote file operation, the mobility token manager 101 on the source computer 113 can close the mobility token 103 on the target computer 117 that corresponds to the written mobile file 105, before or as the file close or cleanup operation is committed. Since the mobility token manager 101 on the source computer 113 holds an exclusive lock to be able to write to the target mobile file 105, then it can be assumed that it can write the associated mobility token 103 as well.

The mobility token manager 101 running on the target computer 117 recognizes that a mobility token 103 is being written locally. The mobility token manager 101 on the target computer 113 can recognize the mobility token 103 by name, content based signature, size, etc. By reading the information stored in the mobility token 103, the mobility token manager 101 can determine relevant information concerning the recently copied mobile file 105. The mobility token manager 101 on the target computer 117 can read the mobility token 101, for example, when the associated mobile file 105 is closed, or even before it is closed, depending on the desired security policy.

In one embodiment, a new entry is generated and written to a mobility token 103 for every file "open-write-close" session concerning its associated file 105. In some embodiments, there is a maximum number of entries per mobility token 103, so as to keep the token 103 size small. In such embodiments, typically older entries are overwritten when the maximum number of entries is reached. Of course, in other embodiments other cache management techniques can be used as desired.

In some embodiments, the mobility token manager 101 on the target computer 117 merges data from multiple mobility tokens 101, and stores the data in a separate mobility token data store 201 (e.g., a database). In some embodiments, the mobility token manager 101 maintains a mobility token 103 for at least some folders in the file system, as well as for individual files.

The mobility token manager 101 on the target computer 117 can optionally hide mobility tokens 103 so that they cannot be seen or read by any process other than a mobility token manager 101. Implementing file hiding by a file system filter driver 107 is known to those of ordinary skill in the relevant art. In such embodiments, requests to list file names within any folder or directory will not return the name of any hidden mobility token 103, and requests to access a hidden mobility token 103 by name will generate an error condition. In some embodiments, all, some or no mobility tokens 103 are hidden as desired.

When a mobile file 105 is copied from a source computer 113 to a target computer 117, the mobility token manager 101 on the source computer 113 checks to see whether it has an existent associated mobility token 103 for the file 105 to be copied. If an associated token 103 exists, then the mobility token manager 101 will add current information (e.g., information concerning the file 105 and the current write operation) to the mobility token 103. If no mobility token 103 exists for the mobile file 105, then the mobility token manager 101 on the source computer will create a new mobility token 103 concerning the file 105, and write that new mobility token 103 to the target computer 117 with the mobile file 105.

Additionally, the mobility token manager 101 on the source computer 113 can write instructions in a mobility token 103 to instruct the mobility token manager 101 on the target computer 117 to perform or not to perform desired actions. For example, the mobility token manager 101 on the source computer 113 could instruct the mobility token manager 101 on the target computer 117 not to copy the associated mobile file 105 to any additional computers, or to copy it to another specific computer, or to send an acknowledgement of the receipt of the file to a third computer. This type of instructive control can be at any level of detail as desired. For example, a mobility token 103 could include instructions preventing certain source computers 113 from copying an associated file 105 to specific folders on specific target computers 117. Time ranges can also be blacked out or approved for specific movements of files 105 within a network. Of course, the above listed directed actions are examples, and other actions are possible and within the scope of the present invention.

Mobility token managers 101 on target computers 117 can also control incoming network file 105 traffic by reading mobility tokens 103. For example, a target computer 117 could reject files 105 from non-trusted computers, or that have been touched non-trusted users. These are again simply examples of the actions a mobility token manager 101 on a target computer 117 can take responsive to the contents of an incoming mobility token 103.

In one embodiment, at least some mobility tokens 103 contain an indication of whether their associated file 105 has been scanned by an anti-virus scanning engine, and if so an identifier of the virus definition file that was used. This information can be used to scan files 105 as necessary, and to save time and resources by not scanning files 105 unnecessarily as they are moved about within a network.

Figure 3:
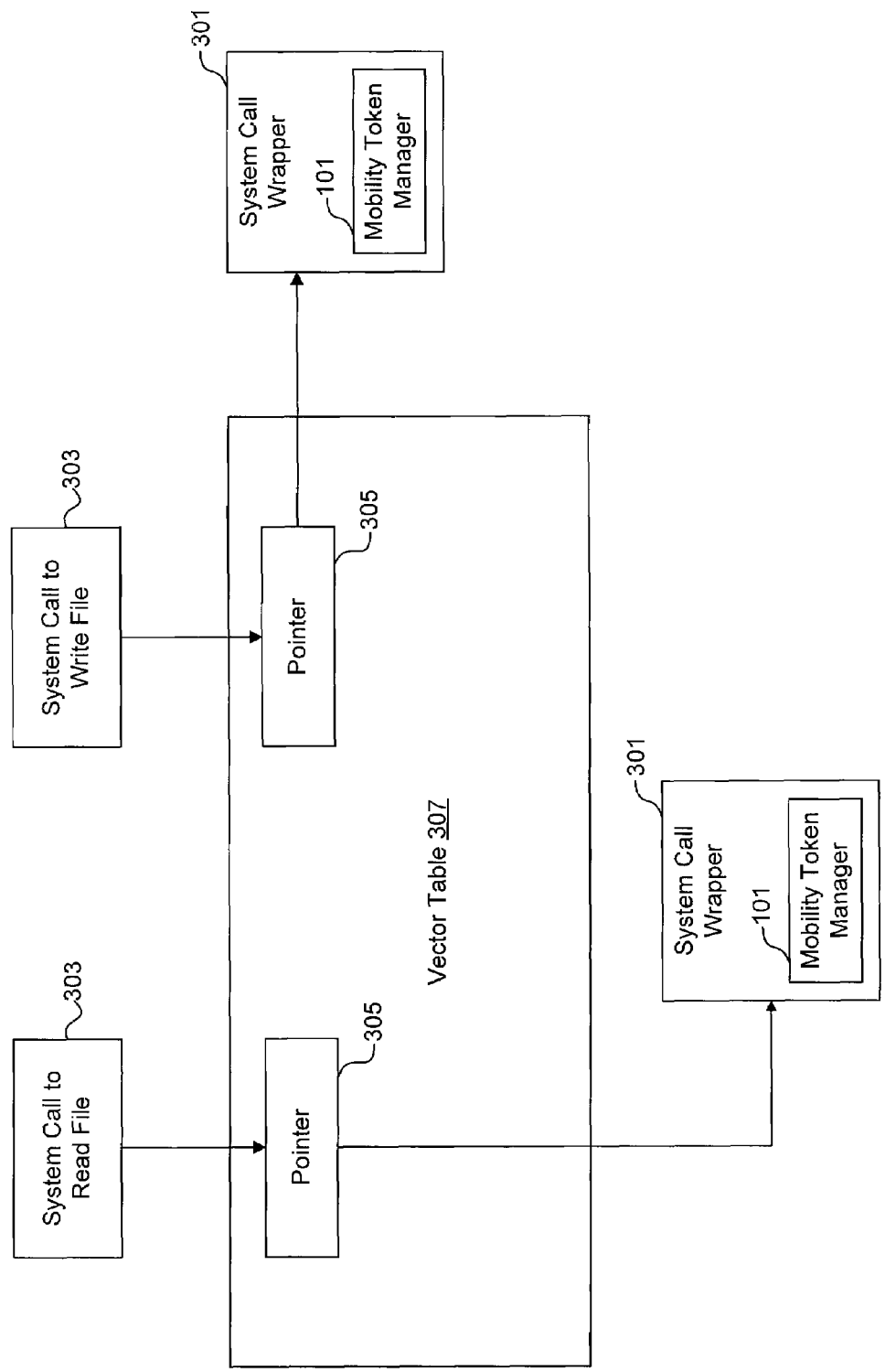
FIG. 3 is a block diagram illustrating an embodiment of the present invention in which a mobility token manager is implemented in the form of system call wrappers.

In some embodiments, the mobility token manager 101 is instantiated in the form of system call wrappers 301, as illustrated in FIG. 3. The implementation mechanics of intercepting system calls 303 by overwriting pointers 305 in an interrupt vector table 307 and redirecting the pointers 305 to system call wrapper 301 is known to those of ordinary skill in the relevant art. In such embodiments, system calls 303 to write and read files 105 are intercepted as desired, and one or more system call wrappers 301 execute the above describe functionality of a mobility token manager 101. Because system calls 303 that read and write files 105 are intercepted, attempts to transfer mobile files 105 through open shares are detected, and corresponding mobility tokens 103 are processed as described above.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for tracking movement of files within a network, the method comprising the steps of:

a mobility token manager on a source computer detecting an attempt to write a file to a target computer; and responsive to the detection, the mobility token manager encrypting a mobility token containing data concerning at least the file and the write operation and writing the mobility token to the target computer.

2. The method of claim 1 wherein:
the mobility token manager is instantiated within a file system filter driver.

3. The method of claim 1 wherein:
the mobility token contains at least one datum concerning the source computer from a group of data consisting of:
an IP address;
a computer name; and
a primary domain controller name.

4. The method of claim 1 wherein:
the mobility token contains at least one datum concerning the file from a group of data consisting of:
a file name;
a content-based hash value;
a digital signature;
a version number;
a last modification date; and
a last modification time.

5. The method of claim 1 wherein:
the mobility token contains at least one datum concerning a user who has ownership of an application program attempting to write the file to the target computer, the datum being from a group of data consisting of:
a user account name;
a user account number; and
a SID.

6. The method of claim 1 wherein:
the mobility token contains at least one datum concerning the attempt to write the file to the target computer, the datum being from a group of data consisting of:
a date of the attempted write operation; and
a time of the attempted write operation.

7. The method of claim 1 further comprising:
the mobility token manager compressing at least one mobility token.

8. The method of claim 1 further comprising:
the mobility token manager hiding at least one mobility token.

9. The method of claim 1 further comprising:
the mobility token manager on the source computer determining whether another mobility token manager is running on the target computer; and
the mobility token manager on the source computer only writing a mobility token to the target computer responsive to determining that another mobility token manager is running on the target computer.

10. The method of claim 1 further comprising:
before writing a mobility token to the target computer, the mobility token manager determining whether a mobility token associated with the file exists;
responsive to results of the determination, the mobility token manager performing a step from a group of steps consisting of:
responsive to determining that an associated mobility token exists, writing information concerning at least the file and the write operation to the mobility token; and
responsive to determining that an associated mobility token does not exist, creating an associated mobility token containing information concerning at least the file and the write operation.

11. The method of claim 1 further comprising:
the mobility token manager writing at least one instruction directed to a target computer in the mobility token.

12. The method of claim 1 wherein:
the mobility token contains an indication that the associated file has been scanned by an anti-malicious code scanning engine, and an indication of a malicious code definition file used for the anti-malicious code scanning.

13. A computer implemented method for tracking movement of files within a network, the method comprising the steps of:
a mobility token manager on a source computer detecting an attempt to write a file to a target computer, wherein the mobility token manager is instantiated as at least one system call wrapper; and
responsive to the detection, the mobility token manager writing a mobility token containing data concerning at least the file and the write operation to the target computer.

14. A computer implemented method for tracking movement of files within a network, the method comprising the steps of:
a mobility token manager on a target computer detecting that a mobility token is being written to the target computer;
the mobility token manager reading the mobility token;
the mobility token manager determining relevant information concerning a file associated with the mobility token; and
the mobility token manager merging data from the mobility token into a mobility token data store containing information from at least one other mobility token.

15. The method of claim 14 further comprising:
the mobility token manager reading at least one instruction for a source computer in the mobility token; and
the mobility token manager executing the at least one instruction.

16. The method of claim 14 further comprising:
the mobility token manager reading the mobility token; and
in response to contents of the mobility token, the mobility token manager rejecting the associated file.

17. The method of claim 14 further comprising:
the mobility token manager reading the mobility token;
from the contents of the mobility token, the mobility token manager determining whether the associated file has been scanned by an anti-malicious code scanning engine using a current malicious code definition file; and
in response to determining that the file has not been scanned using a current malicious code definition file, scanning the file for malicious code.

18. The method of claim 14 wherein:
the mobility token manager is instantiated within a file system filter driver.

19. The method of claim 14 wherein:
the mobility token manager is instantiated as at least one system call wrapper.

20. A computer system for tracking movement of files within a network, the computer system comprising:
a software portion configured to detect an attempt to write a file to a target computer; and
a software portion configured to write a mobility token containing data concerning at least the file and the write operation to the target computer, responsive to the detection.

* * * * *